(12) United States Patent
Kim et al.

(10) Patent No.: US 8,402,333 B2
(45) Date of Patent: Mar. 19, 2013

(54) DEVICE AND METHOD FOR TRANSMITTING DATA

(75) Inventors: Kang-Hee Kim, Busan (KR); Byung-Han Ryu, Daejeon (KR)

(73) Assignees: Electronics and Telecommunications Research Institute, Daejeon (KR); Samsung Electronics Co., Ltd., Suwon-Si (KR)

( * ) Notice: Subject to any disclaimer, the term of this patent is extended or adjusted under 35 U.S.C. 154(b) by 779 days.

(21) Appl. No.: 12/522,807

(22) PCT Filed: Jan. 10, 2008

(86) PCT No.: PCT/KR2008/000177
§ 371 (c)(1),
(2), (4) Date: Jul. 10, 2009

(87) PCT Pub. No.: WO2008/085003
PCT Pub. Date: Jul. 17, 2008

(65) Prior Publication Data
US 2010/0115362 A1    May 6, 2010

(30) Foreign Application Priority Data

Jan. 10, 2007 (KR) .................. 10-2007-0002796
Sep. 13, 2007 (KR) .................. 10-2007-0092997

(51) Int. Cl.
*G08C 25/02* (2006.01)
*H04L 1/18* (2006.01)
(52) U.S. Cl. ........ 714/748; 714/746; 714/752; 375/216; 375/224
(58) Field of Classification Search .................. 714/746, 714/748–752; 375/216, 224
See application file for complete search history.

(56) References Cited

U.S. PATENT DOCUMENTS

| | | | |
|---|---|---|---|
| 6,697,986 B2 | 2/2004 | Kim et al. | |
| 6,731,623 B2 | 5/2004 | Lee et al. | |
| 6,977,888 B1 * | 12/2005 | Frenger et al. | 370/218 |
| 7,007,218 B2 | 2/2006 | Chamberlain | |
| 7,315,898 B2 | 1/2008 | Kohno | |
| 7,346,054 B2 * | 3/2008 | Chen et al. | 370/390 |
| 7,372,836 B2 | 5/2008 | Hwang et al. | |
| 2003/0169741 A1 * | 9/2003 | Torsner et al. | 370/394 |
| 2005/0172197 A1 * | 8/2005 | Chamberlain | 714/748 |
| 2005/0182994 A1 * | 8/2005 | Ashikhmin et al. | 714/748 |
| 2005/0243793 A1 | 11/2005 | Kim et al. | |

FOREIGN PATENT DOCUMENTS

| | | |
|---|---|---|
| KR | 10-2002-0000650 A | 1/2002 |
| KR | 2002-0000650 | 1/2002 |
| KR | 10-2002-0079453 A | 10/2002 |
| KR | 10-2003-0045643 A | 6/2003 |
| KR | 10-2005-0082333 A | 8/2005 |

OTHER PUBLICATIONS

Korean Office Action issued Mar. 31, 2009 in corresponding Korean Application No. 10-2007-0092997.

* cited by examiner

*Primary Examiner* — Sam Rizk
(74) *Attorney, Agent, or Firm* — Staas & Halsey LLP

(57) ABSTRACT

A data transmission device transmits coded packets and a code for decoding the coded packets to a receiving device. The data transmission device retransmits the coded packets and the code to the receiving device when failing to receive feedback information on a decoding success state of the coded packets from the receiving device. Accordingly, the data transmission device can increase the radio resource efficiency in the wireless communication system.

7 Claims, 5 Drawing Sheets

DEVICE AND METHOD FOR TRANSMITTING DATA

CROSS REFERENCE TO RELATED APPLICATIONS

This application claims the benefit of International Application No. PCT/KR2008/000177, filed Jan. 10, 2008, and claims the benefit of Korean Application No. 10-2007-0002796, filed Jan. 10, 2007, and Korean Application No. 10-2007-0092997, filed Sep. 13, 2007, the disclosures of all of which are incorporated herein by reference.

TECHNICAL FIELD

The present invention relates to a data transmission method and device. Particularly, the present invention relates to a data transmission method and device in a wireless communication system.

This work was supported by the IT R&D program of MIC/IITA [2005-S-404-12, Research & Development of Radio Transmission Technology for 3G evolution].

BACKGROUND ART

A wireless communication system uses the hybrid automatic repeat request (HARQ) scheme for using an automatic repeat request (ARQ) in the physical layer. The HARQ scheme is a method for notifying a base station of a state of whether a terminal has successfully received data from the base station through 1-bit feedback information.

Regarding transmitting data to the terminal in the wireless communication system, when the base station transmits control information and data to the terminal, the terminal receives data according to the control information.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

However, the terminal cannot receive the data when it fails to receive the control information. Also, when the terminal fails to receive the data, the terminal cannot transmit feedback information that follows the HARQ scheme to the base station, and the resource is accordingly wasted until the maximum number of repeats of the feedback information is completed.

Technical Solution

The present invention has been made in an effort to increase the efficiency of radio resources in the wireless communication system.

In one aspect of the present invention, a data transmission method for transmitting a plurality of packets to a receiving device includes: coding a first packet from among the plurality of packets to generate a coded first packet; transmitting a first code for decoding the coded first packet and the coded first packet to the receiving device; and retransmitting the coded first packet and the first code to the receiving device when failing to receive feedback information on a decoding success state of the coded first packet from the receiving device.

The data transmission method further includes controlling transmission on the plurality of packets according to the feedback information when receiving the feedback information from the receiving device.

The feedback information includes decoding success information, and the step of control includes coding a second packet from among the plurality of packets to generate a coded second packet, and transmitting the coded second packet and a second code for decoding the coded second packet to the receiving device.

The second code is a redundancy code added to the first code.

The feedback information includes decoding disallowance information, and the step of controlling includes retransmitting the coded first packet and the first code to the receiving device.

In another aspect of the present invention, a data transmission device includes a coder, a transmitter, a receiver, and a controller.

The coder codes a plurality of packets in a data link layer, and outputs the coded packets and a code for decoding the coded packets.

The transmitter transmits the coded packets and the code in a physical layer.

The receiver receives feedback information on a decoding success state of the coded packets transmitted by the transmitter in the physical layer.

The controller controls the coder according to a received state of the feedback information and contents of the feedback information in the data link layer.

The controller controls the coder according to a retransmission instruction when the receiver fails to receive the feedback information, controls the coder according to a transmission instruction when the feedback information includes decoding success information, and controls the coder according to the retransmission instruction when the feedback information includes decoding disallowance information.

According to the exemplary embodiments of the present invention, the feedback information is classified to increase the data decoding rate and radio resource efficiency.

Advantageous Effects

According to the exemplary embodiments of the present invention, when the data transmission device fails to receive feedback information from the data receiving device, the data are retransmitted to increase the decoding success rate at the data receiving device and also increase the radio resource efficiency.

BEST MODE FOR CARRYING OUT THE INVENTION

Figure 1:
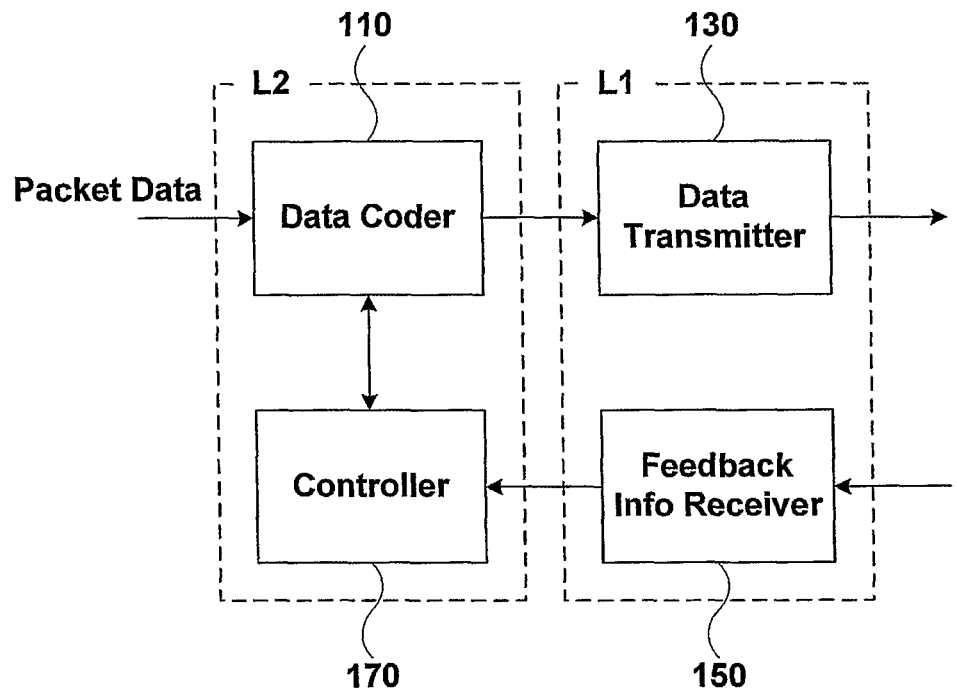
FIG. 1 is a configuration of a data transmission device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word comprising and variations such as comprises will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

Referring to drawings, a data transmission method and device according to an exemplary embodiment of the present invention will now be described.

Referring to FIG. 1, a data transmission device according to an exemplary embodiment of the present invention will now be described.

FIG. 1 is a configuration of a data transmission device according to an exemplary embodiment of the present invention.

As shown in FIG. 1, the data transmission device includes a data coder 110, a data transmitter 130, a feedback information receiver 150, and a controller 170.

The data coder 110 receives packet data, codes the packet data, and outputs the coded packet data. The data coder 110 outputs the coded packet data and control information that includes a code for decoding the coded packet data, and notifies of data transmission. Here, the data coder 110 corresponds to layer 2 (L2) from among 7 layer models of the open systems interconnection (OSI).

The data transmitter 130 receives the coded packet data and the control information from the data coder 110, and transmits the coded packet data and the control information to a data receiving device. The data transmitter 130 corresponds to layer 1 (L1) from among the 7 layer models of the OSI.

The feedback information receiver 150 receives feedback information from the data receiving device. In this instance, the feedback information receiver 150 can receive HARQ-based feedback information. Also, the feedback information receiver 150 corresponds to layer 1 (L1) from among the 7 layer models of the OSI.

The controller 170 receives the feedback information from the feedback information receiver 150, generates a data control instruction according to the feedback information, and transmits the data control instruction to the data output unit 110. The controller 170 controls the data coder 110 according to the data control instruction. The data control instruction includes a transmission instruction and a retransmission instruction. In this instance, the controller 170 can generate the data control instruction when failing to receive the feedback information. Further, the controller 170 corresponds to layer 2 (L2) from among the 7 layer models of the OSI.

Figure 2:
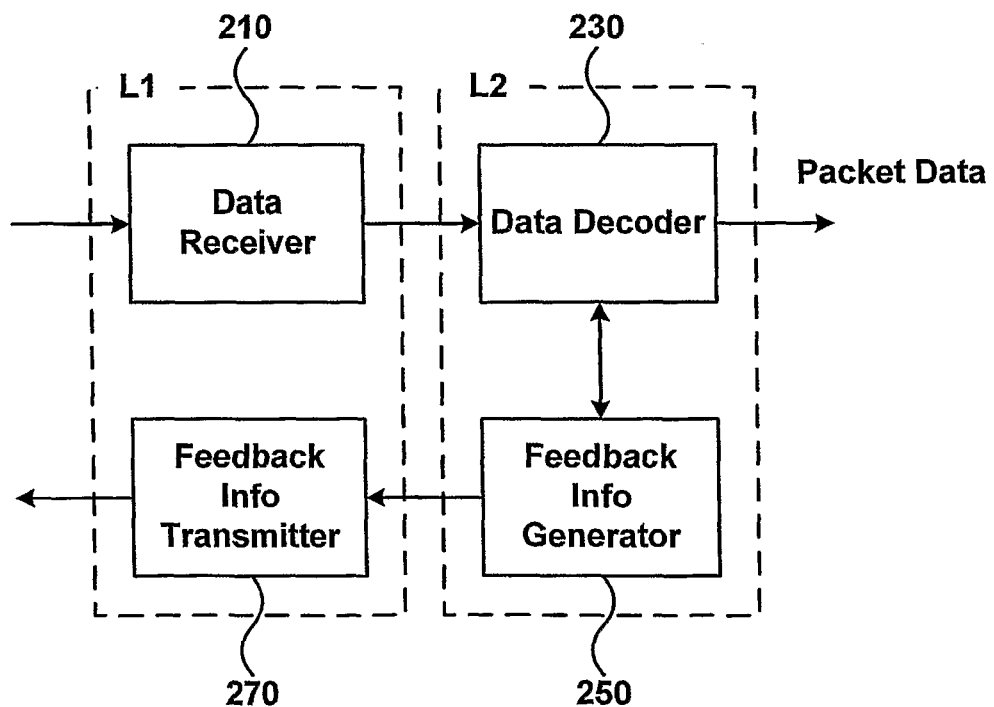
FIG. 2 is a configuration of a data receiving device according to an exemplary embodiment of the present invention.

Referring to FIG. 2, a data receiving device according to an exemplary embodiment of the present invention will now be described.

FIG. 2 is a configuration of a data receiving device according to an exemplary embodiment of the present invention.

As shown in FIG. 2, the data receiving device includes a data receiver 210, a data decoder 230, a feedback information generator 250, and a feedback information transmitter 270.

The data receiver 210 receives the coded packet data and the control information from the data transmission device. In this instance, the data receiver 210 corresponds to layer 1 (L1) from among the 7 layer models of the OSI.

The data decoder 230 receives the coded packet data and the control information from the data receiver 210, decodes the coded packet data according to control information, and outputs the packet data. Here, the data decoder 230 corresponds to layer 2 (L2) of the 7 layer models of the OSI.

The feedback information generator 250 outputs feedback information for notifying of a decoding success state of the data decoder 230. The feedback information includes decoding success information (ACK) and decoding disallowance information (NACK). Here, the feedback information generator 250 corresponds to layer 2 (L2) from among the 7 layer models of the OSI.

The feedback information transmitter 270 receives feedback information from the feedback information generator 250, and transmits the feedback information to the data transmission device. In this instance, the feedback information transmitter 270 corresponds to layer (L1) of the 7 layer models of the OSI.

Figure 3:
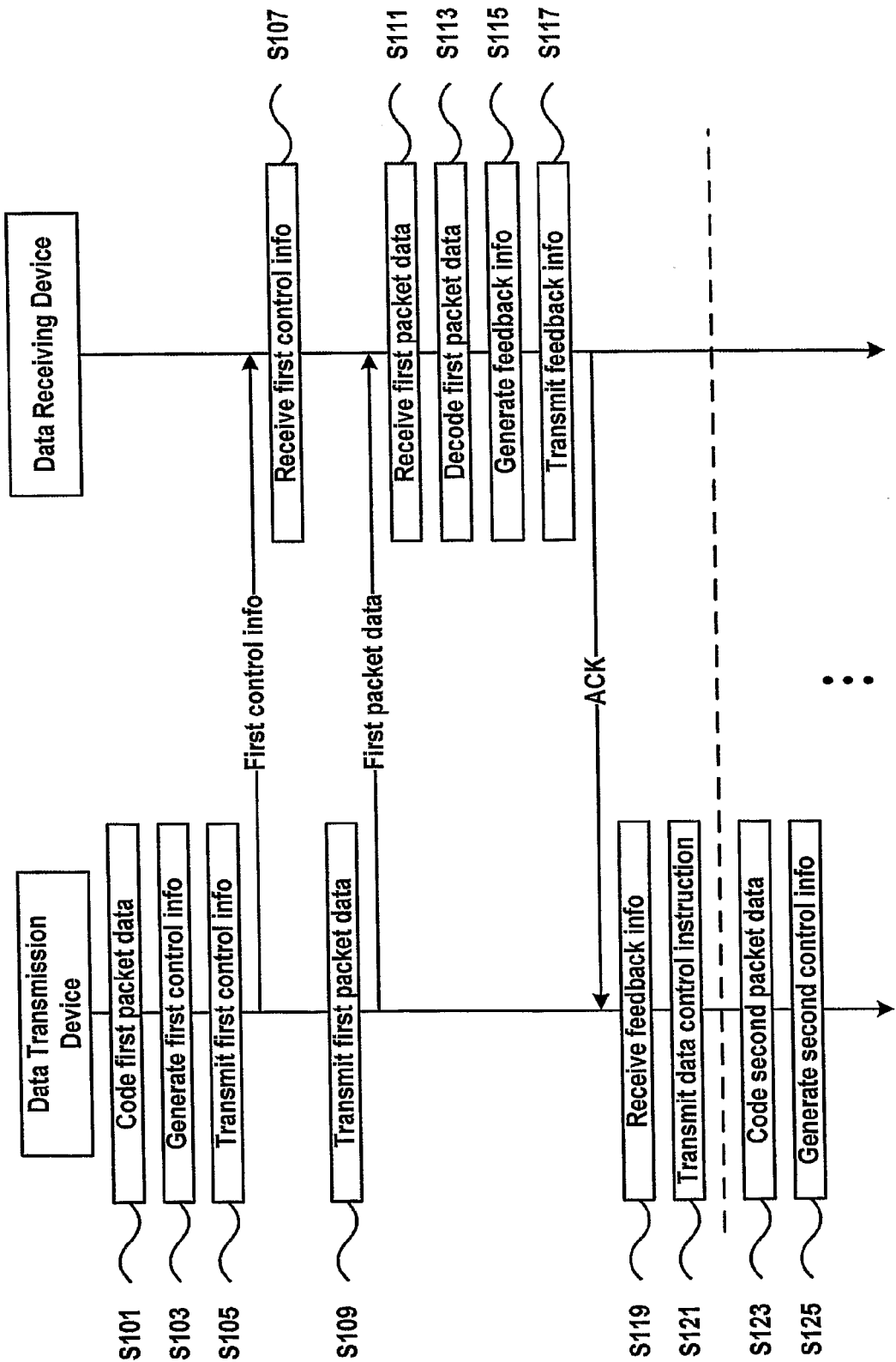
FIG. 3 is a flowchart of a method for transmitting a plurality of packet data according to an exemplary embodiment of the present invention.

Referring to FIG. 3, a method for transmitting a plurality of packet data according to an exemplary embodiment of the present invention will now be described.

FIG. 3 is a flowchart of a method for transmitting a plurality of packet data according to an exemplary embodiment of the present invention.

As shown in FIG. 3, the data coder 110 of the data transmission device codes first packet data that corresponds to the first packet data from among a plurality of packet data to generate the coded first packet data (S101).

The data coder 110 generates first control information that includes a code for decoding the coded first packet data and notifies of transmission of the coded first packet data (S103). In this instance, the data coder 110 can generate first control information including a systematic code that can be self-decoded.

When the data transmitter 130 of the data transmission device transmits first control information to the data receiving device (S105), the data receiver 210 of the data receiving device receives the first control information (S107).

When the data transmitter 130 of the data transmission device transmits the coded first packet data to the data receiving device (S109), the data receiver 210 of the data receiving device receives the coded first packet data (S111).

The data decoder 230 of the data receiving device generates first packet data by decoding the coded first packet data based on the systematic code included in the first control information (S113).

The feedback information generator 250 of the data receiving device generates feedback information for notifying that the data decoder 230 has succeeded in decoding the data (S115). In this instance, the feedback information generator 250 generates feedback information including decoding success information (ACK).

When the feedback information transmitter 270 of the data receiving device transmits feedback information including decoding success information (ACK) to the data transmission device (S117), the feedback information receiver 150 of the data transmission device receives the feedback information including decoding success information (ACK) (S119).

The controller 170 of the data transmission device transmits a data control instruction including a transmission instruction to the data coder 110 according to the decoding success information (ACK) included in the feedback information (S121). The controller 170 controls the data coder 110 to code the second packet data from among a plurality of packet data according to the transmission instruction included in the data control instruction.

The data coder 110 of the data transmission device codes the second packet data that corresponds to the first packet data from among a plurality of packet data according to the transmission instruction of the controller 170 to generate coded second packet data (S123).

The data coder 110 of the data transmission device generates second control information that includes a code for decoding the coded second packet data and notifies of transmission of the coded second packet data (S125). In this instance, the data coder 110 can generate second control information including a redundancy code added to the systematic code included in the first control information.

The same process performed for the first packet data is applied to the second packet data. In this instance, the data decoder 230 of the data receiving device can generate second packet data by decoding the coded second packet data based on the systematic code included in the first control information and the redundancy code included in the second control information.

Figure 4:
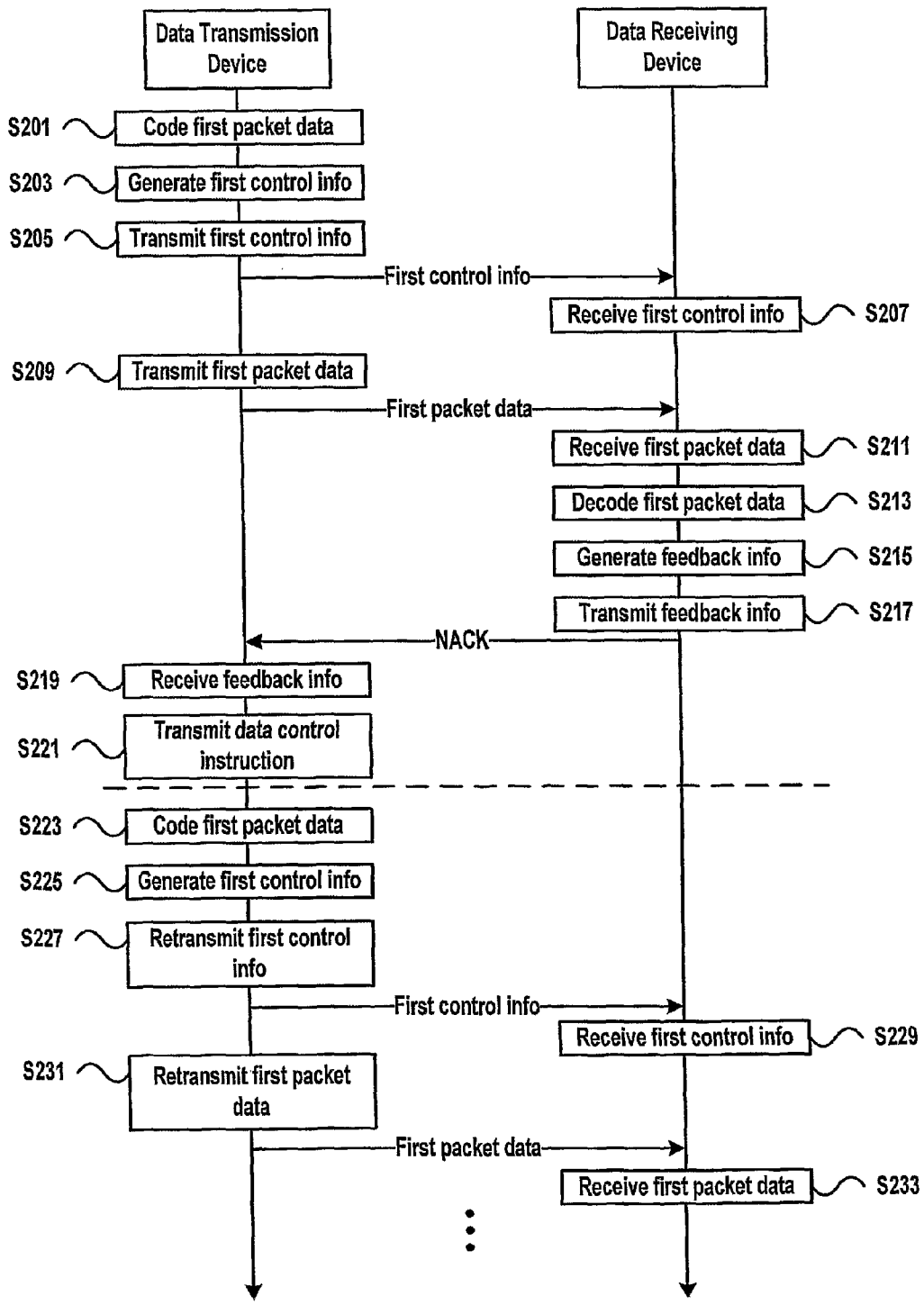
FIG. 4 is another flowchart of a method for transmitting a plurality of packet data according to an exemplary embodiment of the present invention.

Referring to FIG. 4, another method for transmitting a plurality of packet data according to an exemplary embodiment of the present invention will now be described.

FIG. 4 is another flowchart of a method for transmitting a plurality of packet data according to an exemplary embodiment of the present invention.

As shown in FIG. 4, the data coder 110 of the data transmission device codes first packet data that correspond to the first packet data from among a plurality of packet data to generate coded first packet data (S201).

The data coder 110 generates first control information that includes a code for decoding the coded first packet data and notifies of transmission of the coded first packet data (S203). In this instance, the data coder 110 can generate first control information including a systematic code that can be self decoded.

When the data transmitter 130 of the data transmission device transmits first control information to the data receiving device (S205), the data receiver 210 of the data receiving device receives the first control information (S207).

When the data transmitter 130 of the data transmission device transmits coded first packet data to the data receiving device (S209), the data receiver 210 of the data receiving device receives the coded first packet data (S211).

The data decoder 230 of the data receiving device decodes the coded first packet data based on the systematic code included in the first control information (S213).

When the data decoder 230 fails to decode the first packet data, the feedback information generator 250 of the data receiving device generates feedback information for notifying of a decoding disallowance (S215). In this instance, the feedback information generator 250 generates feedback information including decoding disallowance information (NACK).

When the feedback information transmitter 270 of the data receiving device transmits feedback information including decoding disallowance information (NACK) to the data transmission device (S217), the feedback information receiver 150 of the data transmission device receives the feedback information including decoding disallowance information (NACK) (S219).

The controller 170 of the data transmission device transmits a data control instruction including a retransmission instruction to the data coder 110 according to the decoding disallowance information (NACK) included in the feedback information (S221). The controller 170 controls the data coder 110 to code the first packet data according to the retransmission instruction included in the data control instruction so as to retransmit the first packet data.

The data coder 110 of the data transmission device codes the first packet data according to the retransmission instruction of the controller 170 to generate the coded first packet data (S223).

The data coder 110 of the data transmission device generates first control information that includes a code for decoding the coded first packet data and notifies of transmission of the coded first packet data (S225). In this instance, the data coder 110 can generate first control information including a systematic code that can be self decoded.

When the data transmitter 130 of the data transmission device retransmits the first control information to the data receiving device (S227), the data receiver 210 of the data receiving device receives the first control information (S229).

When the data transmitter 130 of the data transmission device retransmits the coded first packet data to the data receiving device (S231), the data receiver 210 of the data receiving device receives the coded first packet data (S233).

Hence, the data receiving device can generate the first packet data by decoding the retransmitted coded first packet data based on the retransmitted first control information.

Figure 5:
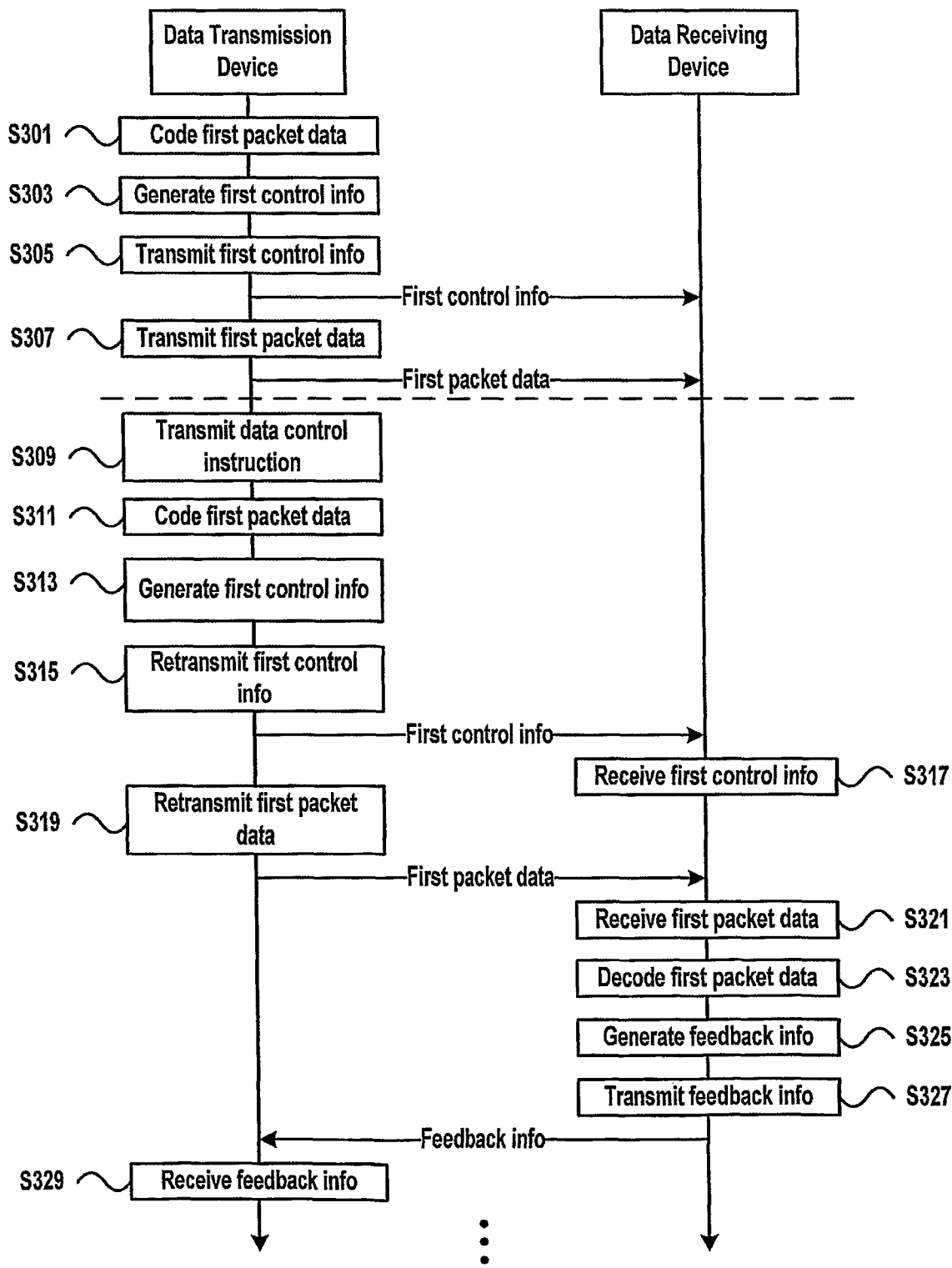
FIG. 5 is another flowchart of a method for transmitting a plurality of packet data according to an exemplary embodiment of the present invention.

Referring to FIG. 5, another method for transmitting a plurality of packet data according to an exemplary embodiment of the present invention will now be described.

FIG. 5 is another flowchart of a method for transmitting a plurality of packet data according to an exemplary embodiment of the present invention.

As shown in FIG. 5, the data coder 110 of the data transmission device codes first packet data that correspond to the first packet data from among a plurality of packet data to generate coded first packet data (S301).

The data coder 110 generates first control information including a code for decoding the coded first packet data (S303). The first control information can notify that the coded first packet data will be transmitted. Here, the data coder 110 can generate first control information including a systematic code that can be self decoded.

The data transmitter 130 of the data transmission device transmits the first control information to the data receiving device (S305). In this instance, the data receiving device may not receive the first control information.

The data transmitter 130 of the data transmission device transmits the coded first packet data to the data receiving device (S307). Here, when failing to receive the first control information, the data receiving device also cannot receive the coded first packet data.

Since the data receiving device fails to receive control information and coded packet data and fails to decode the coded packet data, the data receiving device may fail to transmit the feedback information, or the data transmission device may fail to receive the feedback information even when the data receiving device has transmitted the feedback information. In this case, the radio resource is wasted until the maximum retransmission time of feedback information is finished.

Here, when failing to receive the feedback information for a predetermined time, the controller 170 of the data transmission device transmits a data control instruction including a retransmission instruction to the data coder 110 (S309). The controller 170 controls the data coder 110 to code the first packet data according to the retransmission instruction included in the data control instruction so as to retransmit the first packet data.

The data coder 110 of the data transmission device codes the first packet data according to the retransmission instruction of the controller 170 to generate coded first packet data (S311).

The data coder 110 of the data transmission device generates first control information that includes a code for decoding the coded first packet data and notifies of transmission of the coded first packet data (S313). In this instance, the data coder 110 can generate first control information including a systematic code that can be self decoded.

When the data transmitter 130 of the data transmission device retransmits the first control information to the data receiving device (S315), the data receiver 210 of the data receiving device receives the first control information (S317).

When the data transmitter 130 of the data transmission device retransmits the coded first packet data to the data receiving device (S319), the data receiver 210 of the data receiving device receives the coded first packet data (S321).

The data decoder 230 of the data receiving device decodes the coded first packet data based on the systematic code included in the first control information (S323).

The feedback information receiver 250 of the data receiving device generates feedback information including one of the decoding success information (ACK) and the decoding disallowance information (NACK) depending on the decoding success state of the coded first packet data (S325).

When the feedback information transmitter 270 of the data receiving device transmits feedback information to the data transmission device (S217), the feedback information receiver 150 of the data transmission device receives the feedback information (S219).

The controller 170 of the data transmission device controls the data coder 110 according to the decoding success information (ACK) or the decoding disallowance information (NACK) included in the feedback information.

According to the exemplary embodiments of the present invention, when the data transmission device fails to receive feedback information from the data receiving device, the data are retransmitted to increase the decoding success rate at the data receiving device and also increase the radio resource efficiency.

Figure 6:
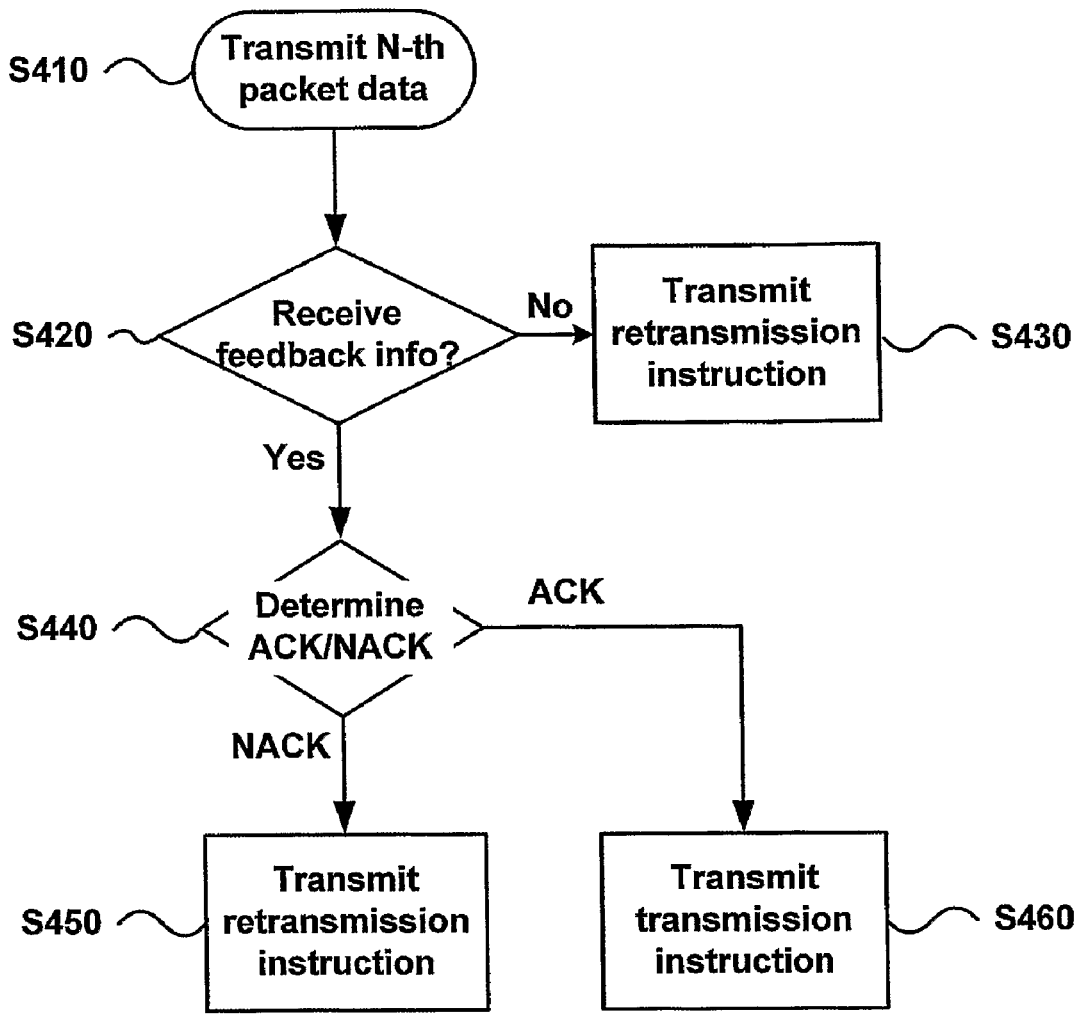
FIG. 6 is a flowchart of a method for controlling a data coder according to an exemplary embodiment of the present invention.

Referring to FIG. 6, a method for the controller of the data transmission device to control the data coder according to the data control instruction according to an exemplary embodiment of the present invention will now be described.

FIG. 6 is a flowchart of a method for controlling a data coder according to an exemplary embodiment of the present invention.

As shown in FIG. 6, the data transmission device transmits the N-th packet data from among a plurality of packet data (S410)

The controller 170 of the data transmission device determines whether feedback information is received from the data receiving device (S420).

When failing to receive feedback information, the controller 170 transmits a data control instruction including a retransmission instruction to the data coder 110 to retransmit the N-th packet data (S430).

When having received the feedback information, the controller 170 determines whether the feedback information includes the decoding success information (ACK) or the decoding disallowance information (NACK) (S440).

When the feedback information includes the decoding disallowance information (NACK), the controller 170 transmits the data control instruction including a retransmission instruction to the data coder 110 to thus retransmit the N-th packet data (S450).

When the feedback information includes the decoding success information (ACK), the controller 170 transmits the data control instruction including the transmission instruction to the data coder 110 to transmit the (N+1)th packet data to the data coder 110 (S460).

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A data transmission method for transmitting a plurality of packets to a receiving device, the method comprising:
coding a first packet from among the plurality of packets to generate a coded first packet and control information that has a systematic code that can be self decoded;
transmitting the control information and the coded first packet to the receiving device;
receiving feedback information form the receiver; and
retransmitting the control information and the coded first packet to the receiving device when failing to receive feedback information on a decoding success state of the coded first packet from the receiving device indicating that decoding was successful.

2. The data transmission method of claim 1, further comprising:
controlling transmission of the plurality of packets according to the feedback information when receiving the feedback information from the receiving device.

3. The data transmission method of claim 2, wherein
the feedback information includes decoding success information, and
the step of control includes:
coding a second packet from among the plurality of packets to generate a coded second packet; and
transmitting the coded second packet and a second code for decoding the coded second packet to the receiving device.

4. The data transmission method of claim 3, wherein the second code is a redundancy code added to the first code.

5. The data transmission method of claim 2, wherein
the feedback information includes decoding disallowance information, and
the step of controlling includes retransmitting the coded first packet and the first code to the receiving device.

6. A data transmission device comprising:
a coder for coding a plurality of packets in a data link layer, and outputting the coded packets and control information that has a systematic code that can be self decoded;
a transmitter for transmitting the coded packets and the control information in a physical layer;
a receiver for receiving feedback information on a decoding success state of the coded packets transmitted by the transmitter in the physical layer the decoding success state indicating that decoding was successful; and
a controller for controlling the coder and transmitter according to a received state of the feedback information and contents of the feedback information in the data link layer and retransmitting the control information and the coded first packet to when failing to receive feedback information on a decoding success state of the coded first packet indicating that decoding was successful.

7. The data transmission device of claim 6, wherein
the controller controls the coder according to a retransmission instruction when the receiver fails to receive the feedback information,
the controller controls the coder according to a transmission instruction when the feedback information includes decoding success information, and
the controller controls the coder according to the retransmission instruction when the feedback information includes decoding disallowance information.

* * * * *